H. P. FOUQUÉ.
AUTOMOBILE TIRE.
APPLICATION FILED JUNE 21, 1912.
1,067,726.
Patented July 15, 1913.
2 SHEETS—SHEET 1.
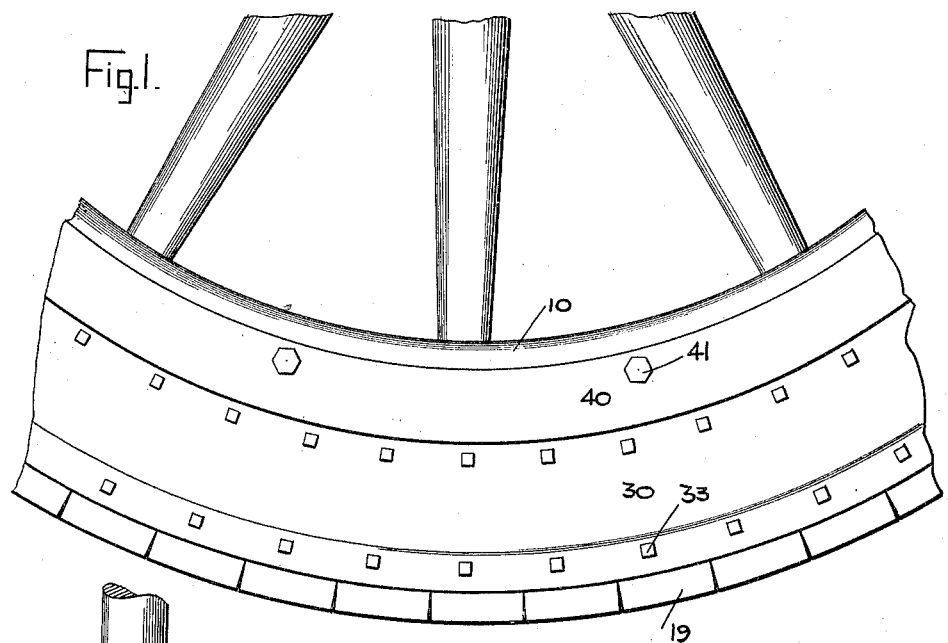
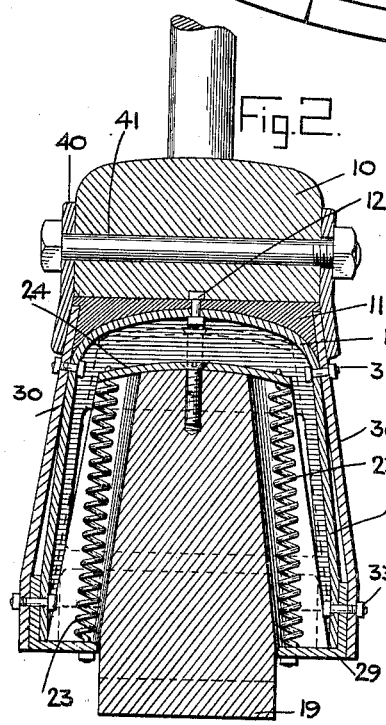
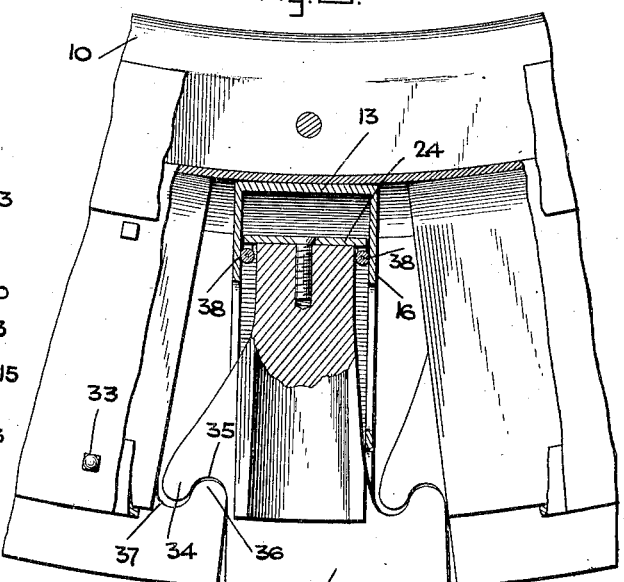
WITNESSES
INVENTOR
Henry P. Fouqué
BY
ATTORNEYS

H. P. FOUQUÉ.
AUTOMOBILE TIRE.
APPLICATION FILED JUNE 21, 1912.

1,067,726.

Patented July 15, 1913.
2 SHEETS—SHEET 2.

WITNESSES
C. K. Reichenbach.
J. L. McAuliffe

INVENTOR
Henry P. Fouqué
BY Munn & Co
ATTORNEYS

UNITED STATES PATENT OFFICE.

HENRY P. FOUQUÉ, OF NEW YORK, N. Y.

AUTOMOBILE-TIRE.

1,067,726. Specification of Letters Patent. Patented July 15, 1913.

Application filed June 21, 1912. Serial No. 705,002.

*To all whom it may concern:*

Be it known that I, HENRY P. FOUQUÉ, a citizen of the United States, and a resident of the city of New York, borough of Brooklyn, in the county of Kings and State of New York, have invented a new and Improved Automobile-Tire, of which the following is a full, clear, and exact description.

The invention relates to spring tires adapted to be employed on the wheels of automobiles and other vehicles as a substitute for pneumatic tires.

The invention consists in the novel construction and combination of parts, as will be particularly explained in the specific description hereinafter to be given.

Reference is to be had to the accompanying drawings forming a part of this specification, in which similar characters of reference indicate corresponding parts in all the views.

Figure 4:
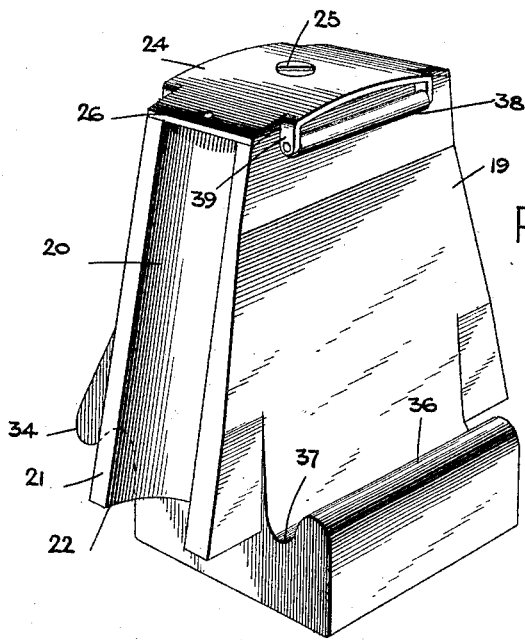
Figure 5:
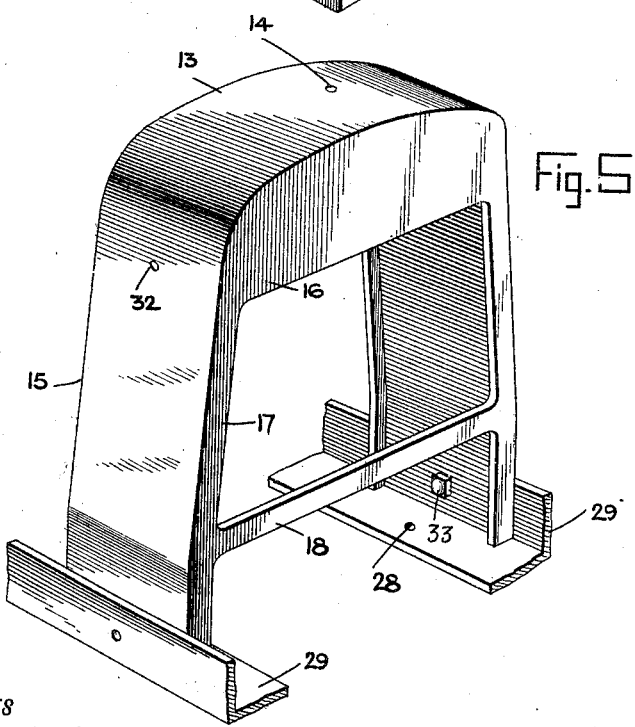

Figure 1 is a side elevation of a portion of a wheel embodying my invention; Fig. 2 is a vertical transverse section on a somewhat larger scale; Fig. 3 is a side elevation of a portion of a wheel, parts being broken away; Fig. 4 is a perspective view of my improved tread block; and Fig. 5 is a perspective view of one of the housings for receiving the tread block, the view showing also parts of angle irons preferably employed to retain the tread blocks in position.

In embodying my invention in a wheel in accordance with the illustrated example, the rim 10 of the wheel may be of any approved arrangement, and seated on the perimeter of the rim is an annular base member 11, to which are secured by bolts 12, or their equivalents, arched housing members 13, the bolts passing through holes 14 in the said housings. The use of the bolts or other fastening means at this point is not essential, however. The sides or legs 15 of the arched housing 13 preferably diverge so that the housings are wider at the outer ends, and at the front and back the housings have flanges 16 at the top, flanges 17 at the sides and a cross bar 18 joining the legs 15 near the outer ends, as clearly shown in Fig. 5. Within each individual housing 13 a tread block 19 is mounted for radial movement, said blocks preferably tapering toward the inner end. On each side edge of a tread block vertical grooves or depressions 20 are produced, the side walls of the said grooves terminating at their lower ends, as at 21, in the form of flanges, the under sides 22 of which present shoulders located at a point inward from the peripheral surface or face of the tread block.

The grooves 20 accommodate retractile springs 23, the upper ends of which are secured in any suitable manner to the ends of a plate 24 which is secured as by a screw 25 or other means, to the inner end of the tread block, the said ends of the plate 24 overhanging at the inner ends of the grooves 20. In the example shown, the upper ends of the springs 23 pass through holes 26 in the plate 24, and the outer ends of the spring are passed through holes 28 in annular angle irons 29, which are disposed at each side of the tire at the outer ends of the legs 15 of the housings 13. At each side of the tire outside of the housings 13 and extending annularly of the wheel, side plates 30 are disposed, said plates at their inner ends being received in the rabbeted sides of the annular base members 11. The side plates 30 constitute housings for the previously described elements, and desirably in practice they are secured by bolts 31 or equivalent means to the arched individual housings 13 near the inner ends or bases of the latter, as clearly shown in Fig. 2, the said bolts passing through holes 32 in the housings 13 and through similar holes in the side plates 30. Near the outer edges the side plates 30 are bolted to the legs 15 of the housings 13, and to the annular angle irons 29, as by bolts 33.

Each tread block 19 is formed as at the front and back faces with projections that interlock with adjacent tread blocks, thus a projection 34 at one side extends outwardly toward the tread surface, but is located a distance inward from said surface. Adjacent to said projection between the same and the body of the tread block, a depression 35 is formed, the projection and depression being preferably curved. On the opposite side of the tread block an inwardly disposed projection 36 is formed adjacent to a depression or groove 37. The arrangement is such that the outwardly disposed projection 34 on the back or the front of the block is received in the corresponding depression 37 in the adjacent block, while a projection 36 at the opposite side will be received in the corresponding depression or groove 35 of an adjacent block.

In order to facilitate the guided movement of the tread blocks 19 within the housings 13, the blocks are preferably provided with friction rollers 38, which are journaled in parallel flanges 39 that are upset from the described plate 24 on the inner end of the tread block, the said friction rollers bearing against the inner surfaces of the front and rear flanges 16 on the housings 13. At the base of the side plates 30 retaining rings or annular side plates 40 are secured to the rim 10 of the wheel by transverse bolts 41, or equivalent means, the outer edges of the said rings 40 overlapping at the outside of the housing plates 30, thus retaining the tire in position.

By the described construction it will be observed that the several tread blocks are inter-engaged with each other. The retractile springs 23 give the tread blocks the necessary elasticity and the guided housing and retaining means serve to give strength and protection to the mobile elements. The springs normally press the tread blocks outward, with the shoulders 22 bearing against the annular angle irons 29. In practice, I prefer to form the tread blocks 19 of aluminium, but it will be understood that rubber, wood, or other suitable material may be employed if desired.

Having thus described my invention, I claim as new and desire to secure by Letters Patent:

1. A tire, comprising an annular series of separate tread blocks, retractile springs secured at their inner ends to the inner ends of the tread blocks, at the sides of the latter, the said tread blocks having side grooves in which the springs are disposed, and retaining means at the outer ends of the said grooves, the outer ends of the springs being secured to the retaining means.

2. A tire, having an annular series of spring-pressed tread blocks, each tread block having a plate at its inner end, and grooves in the side faces of the blocks, the mentioned plates extending over the said grooves, retractile springs received in said grooves and secured at their inner ends to the ends of the said plates, angle irons extending annularly around the tire on each side of the tread blocks near the outer ends thereof, to which angle irons the outer ends of the retractile springs are secured, and housing members secured to the said angle irons.

3. A wheel having a rim and a tire, comprising an annular series of tread blocks, springs normally tending to move said blocks outward, individual housings for the said blocks, side plates extending annularly of the tire outside of the said housings and secured thereto, and retaining rings for the tread blocks, said rings having members secured between the sides of the housings and the mentioned side plates and having lateral, inwardly-projecting flanges, the mentioned springs being connected with said flanges and with the inner portions of the tread blocks.

In testimony whereof, I have signed my name to this specification in the presence of two subscribing witnesses.

HENRY P. FOUQUÉ.

Witnesses:
 AUGUST SPIESS,
 THOMAS AUKETELL.

---

Copies of this patent may be obtained for five cents each, by addressing the "Commissioner of Patents, Washington, D. C."